UNITED STATES PATENT OFFICE.

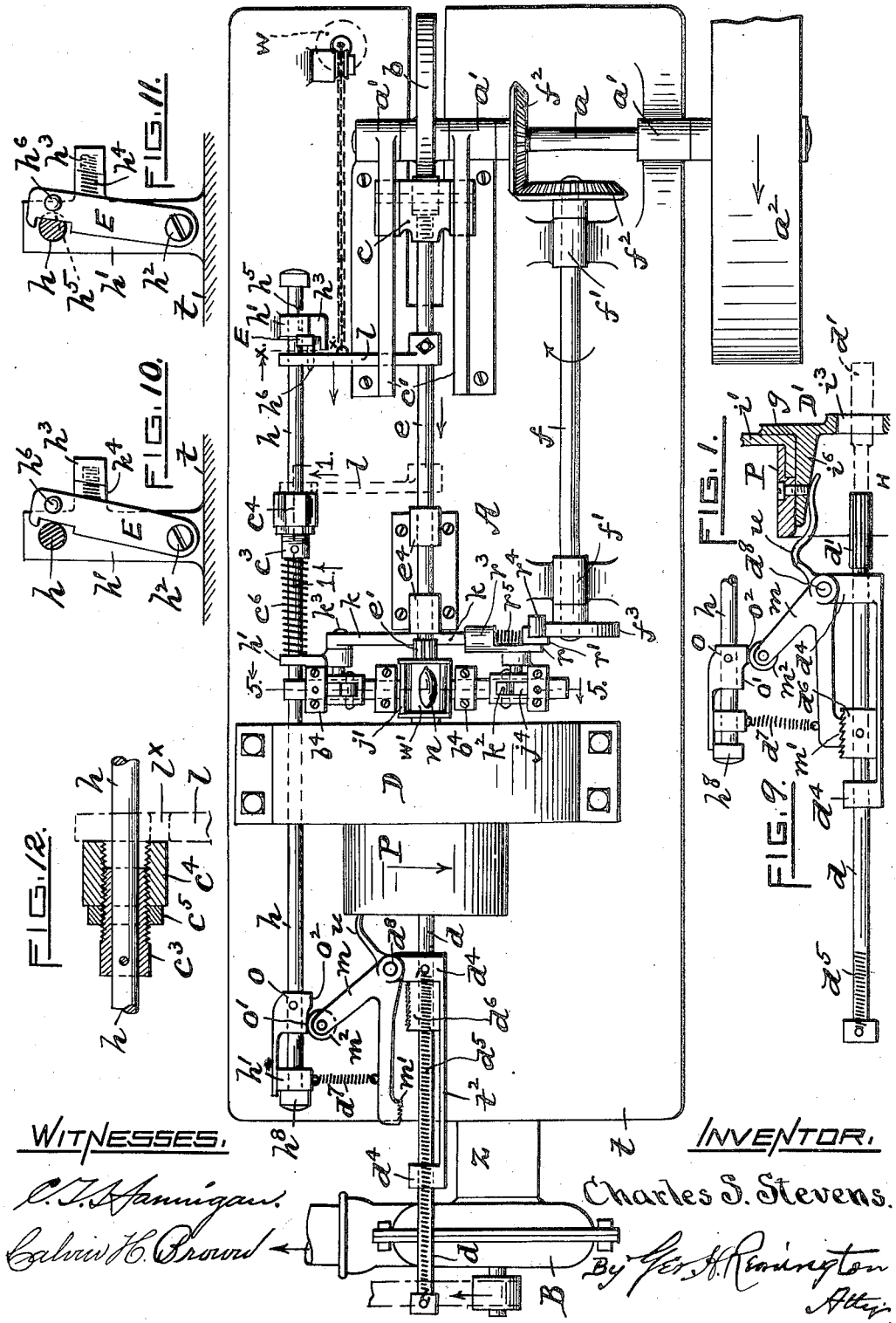

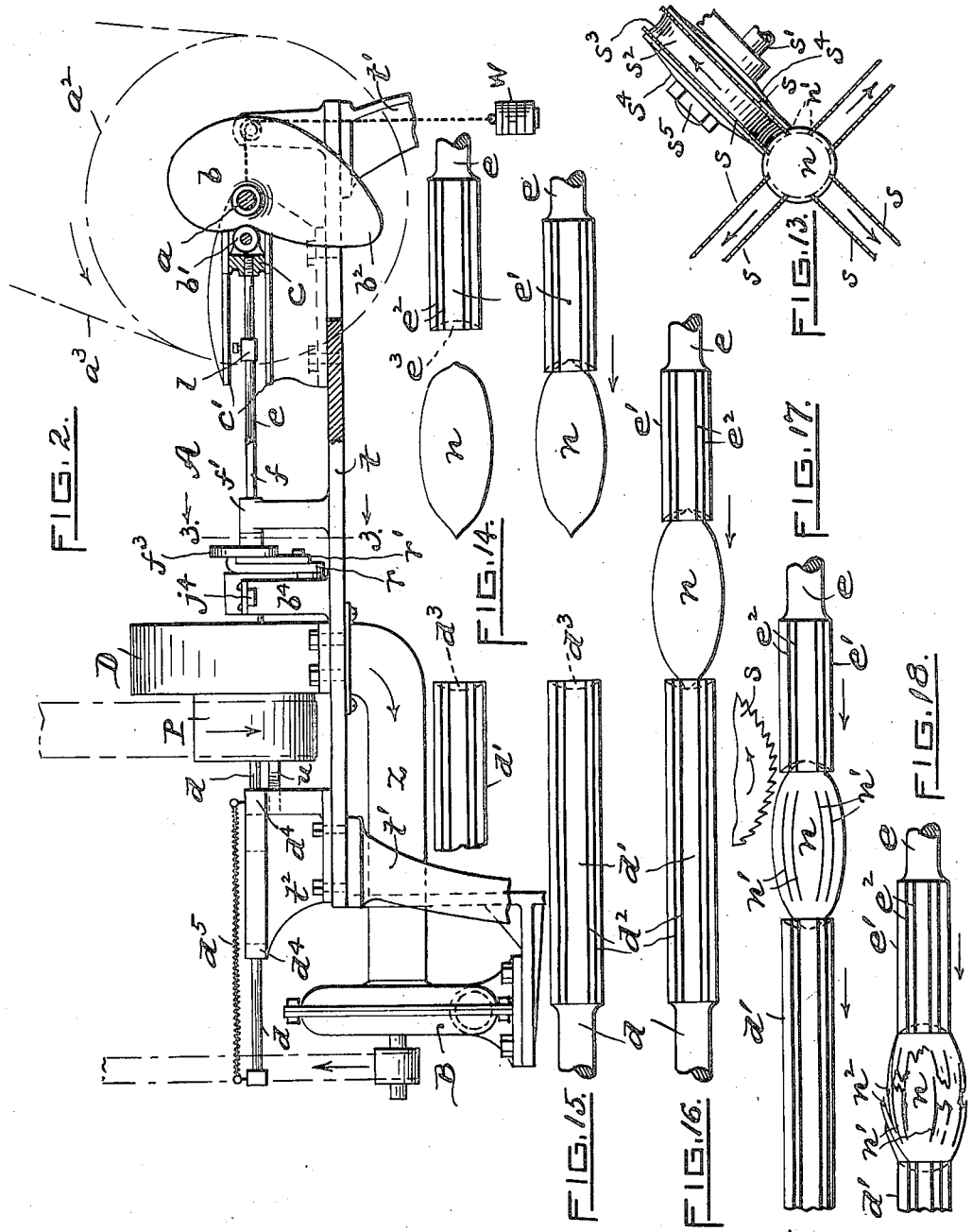

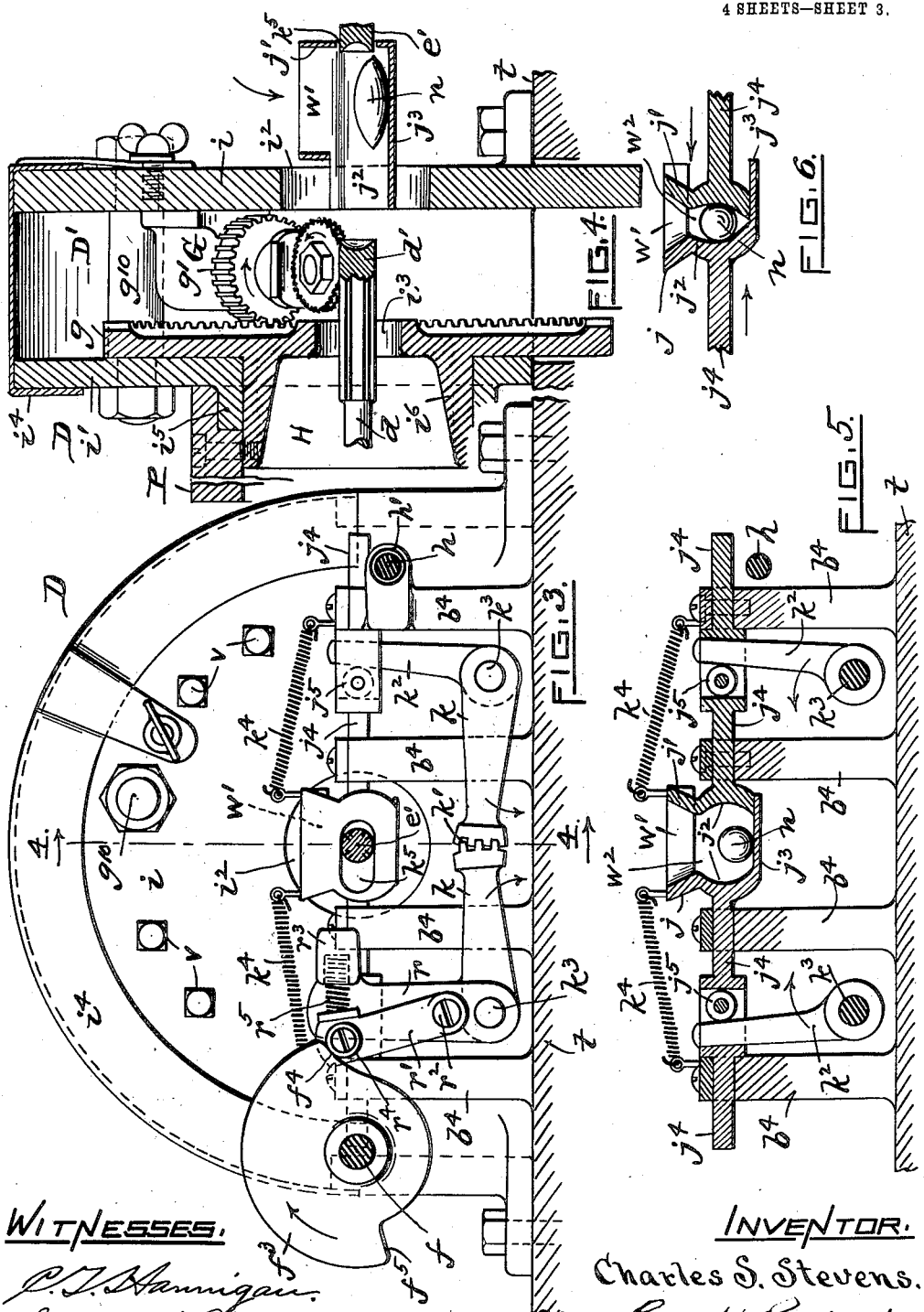

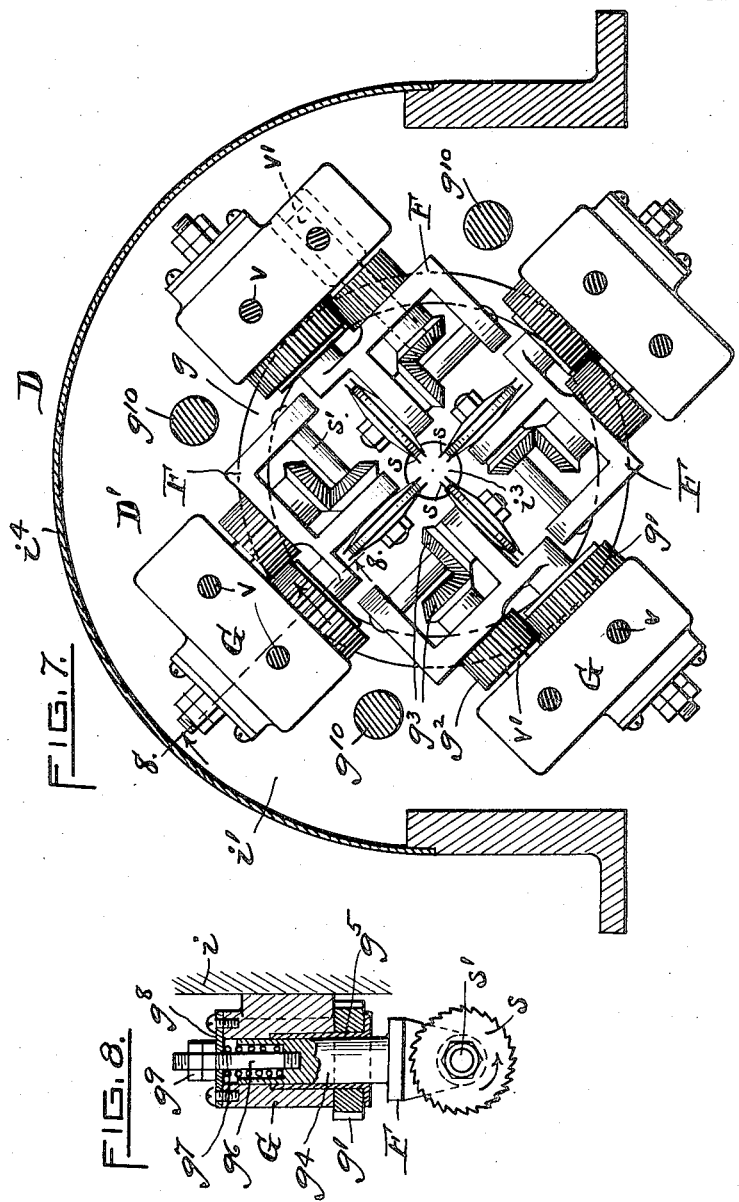

CHARLES S. STEVENS, OF SUNCOOK, NEW HAMPSHIRE, ASSIGNOR TO WILLIS H. STOKES, OF PROVIDENCE, RHODE ISLAND.

MACHINE FOR SHELLING NUTS.

No. 914,082.　　　Specification of Letters Patent.　　Patented March 2, 1909.

Application filed September 4, 1908. Serial No. 451,749.

*To all whom it may concern:*

Be it known that I, CHARLES S. STEVENS, a citizen of the United States of America, and a resident of Suncook, in the county of Merrimack and State of New Hampshire, have invented certain new and useful Improvements in Machines for Shelling Nuts, of which the following is a specification.

This invention relates to nut-shelling machines, so-called, and it consists in the novel construction and combination of parts and devices hereinafter fully set forth and claimed.

The principal object sought to be attained by the present invention is to produce an automatic power-actuated machine capable of shelling nuts in a comparatively inexpensive, simple and efficient manner, the output or product of the machine consisting of a much greater percentage of whole or unbroken meats than is or can be produced in nut-shelling machines heretofore devised, so far as I am aware.

In a machine of the class referred to and as provided with my improvements the nuts are received singly and held endwise between alining non-revoluble plunger and anvil members, which then in advancing subject the shell of the nut to a series of rapidly revoluble surrounding saws which cut corresponding slits or incisions longitudinally therein, followed by contracting the distance between the adjacent ends of the plunger and anvil members, thereby correspondingly compressing the nut still held by them and cracking or fracturing its shell transversely at or near the ends of the slitted portions; after which the said holding members are separated and returned to their respective normal positions, the thus acted upon nut meanwhile dropping into a receptacle below. The jaws and holding devices are adapted to automatically accommodate themselves to nuts varying in size and form both longitudinally and transversely and to centralize them therein. The saws or slitting devices are yieldingly mounted and adapted to conform to the contour of the nut and at the same time produce incisions in the latter having a predetermined depth or gage. The shell-cracking device, in coöperation with the plunger and anvil, is capable of adjustment so as to exert a greater or less endwise pressure upon the nut as described. Another advantage possessed by the present improved machine is the employment of air suction for exhausting dust, chips and foreign matter from the main operating head whereby the nuts are finally discharged in a much better condition.

In the accompanying four sheets of drawings illustrating my improved machine for shelling nuts, Figure 1 represents a top plan view of the organized mechanism, the several devices being shown in the normal positions preparatory to receiving, slitting and cracking a nut. Fig. 2 is a corresponding front side elevation in reduced scale, a portion being represented in section. Fig. 3 is a transverse sectional view in enlarged scale, taken substantially on line 3 3 of Fig. 2, showing the nut-receiving jaws, main operating head, &c. Fig. 4 is a vertical sectional view through the head, taken on line 4 4 of Fig. 3. Fig. 5 is a transverse sectional view through the normally open jaws, &c., taken on line 5 5 of Fig. 1. Fig. 6 is a similar view of the jaws only, showing the latter closed and supporting a nut centralized between them. Fig. 7 is a vertical sectional view of the main operating head, showing the manner of arranging and driving the shell-slitting saws. Fig. 8 is a detailed sectional view of one of the saw holders, &c., taken on line 8 8 of Fig. 7. Fig. 9 is a partial detail plan view, partly in section, showing the front anvil member in the locked stationary position. Fig. 10 is a cross-sectional view enlarged, taken on line $x\,x$ of Fig. 1, showing the rod or connection, &c., for locking the anvil in position. Fig. 11 is a similar view, showing said rod in the locked position. Fig. 12 is an enlarged longitudinal central sectional view of the pressure adjusting device, taken on line 1 1 of Fig. 1. Fig. 13 is an end view showing the relation of the several saws to the nut while the shell of the latter is being longitudinally slitted. Figs. 14, 15, 16 and 17 represent in plan view and in enlarged scale different positions of the nut and its holding means while it is being operated upon; the nut-receiving jaws being omitted, and Fig. 18 shows the nut at the completion of the slitting and cracking operations immediately preceding its release from the plunger and anvil members.

The following is a more detailed description of my improved nut-shelling machine: It may be stated, however, that while the machine may be readily adapted to shell various kinds of nuts the drawings represent it as being employed for shelling pecans.

The machine as a whole is indicated by A. It has a bed or table $t$ supported by legs $t^1$. The driving mechanism is located at the rear end of the machine and consists of a short transversely arranged horizontal shaft $a$ revoluble in bearings $a^1$, and driven by a belt $a^3$ running over a pulley $a^2$ secured to said shaft. At or about the center of the rear end of the bed is located the plunger-actuating cam $b$ secured to the shaft. The form of the cam is such as to impart variable movements to the said plunger-rod $e$ secured to the cross-head $c$ mounted to reciprocate in ways $c^1$. As drawn the cross-head carries a truck-roll $b^1$ in direct frictional contact with the cam's periphery. The cam is adapted to positively actuate the plunger during the forward or working stroke, a weight $w$ attached to a suitably supported chain and connected to an arm member $l$ adjustably secured to the plunger rod is employed to return the plunger back to the normal position preparatory to making the next working stroke. See Figs. 1 and 2. The plunger-rod $e$ is also supported in bearings $e^4$ located contiguous to the jaws $j\ j^1$, soon to be described.

The front end portion $e^1$, constituting the plunger proper, is cylindrical and somewhat thicker than its rod or shank part. Its periphery is provided with a series of parallel longitudinal grooves $e^2$ adapted to freely receive the corresponding portion of the several slitting-saws. Opposed to and in alinement with the plunger is a horizontally mounted and guided front member or rod $d$, its rear end portion being enlarged to form a member $d^1$, which I term an anvil. The adjacent inner ends of the members $e^1\ d^1$ are recessed at $e^3\ d^3$ respectively to receive and hold a nut, as $n$. The surface of the anvil is also provided with grooves, $d^2$, registering or alining with those of the plunger, as clearly shown in Figs. 14 to 18. The said nut-receiving jaws, $j$, $j^1$, and the medium for effecting and controlling their movements are located immediately back of the main operating head D, in which latter the shell-slitting saws are operatively mounted. See Figs. 3 to 6. As drawn, the jaws are horizontally slidable transversely of the machine and extend longitudinally through an opening $i^2$ into said head. The two jaw members form a hopper-like opening $w^1$ communicating with a nut supporting chamber $w^2$ having curved inner side walls $j^2$. The front jaw, $j$, has a bottom plate $j^3$ and a rear end part provided with an elongated opening $k^5$, the latter having the plunger extending therethrough. Each jaw member has a slotted horizontal supporting-bar $j^4$ mounted to slide in bearings $b^4$. Each jaw is actuated by an arm $k^2$ whose free end passes upwardly through the slotted part of said bar and engages a roll $j^5$ carried by the latter. The lower end of the arm is secured to a suitably supported short rock-shaft $k^3$, which in turn has a substantially horizontal lever $k$ fixed to its rear end. The inner or free end of each lever is provided with gear teeth $k^1$ arranged in a segment form; these levers are intermeshing thereby insuring that when in action the two jaws will be moved simultaneously but in opposite directions toward and from each other.

The means for effecting the movements of the levers $k$ is as follows: A horizontal shaft $f$ is mounted to revolve in bearings $f^1$ arranged at the front side and longitudinally of the table $t$ and is driven by a pair of bevel gears, $f^2\ f^2$, secured to shafts $a$ and $f$. To the front end of the last named shaft a cam $f^3$ is fixed, its face or peripheral rim being arranged with respect to a roll $r^4$ (Figs. 1 and 3) carried by a vertically extending arm $r^1$ pivoted at $r^2$ to a fellow arm $r$ secured to the corresponding rock-shaft. The member $r$ has a projection $r^3$ in which a push-spring $r^5$ is seated, its other end pressing the arm $r^1$. By means of this device the jaws are brought toward each other by the cam action to yieldingly engage and automatically adapt itself to nuts varying in size and to hold them singly in position between the jaws without undue pressure. The working portion $f^4$ of the cam acts to close the jaws and position the nut before the latter is engaged by the plunger and anvil members. The outer concentric part of the cam serves to keep the jaws closed until the nut has been acted upon by the saws. When the portion $f^5$ of the cam passes the said roll $r^4$ the two pull-springs $k^4$ in coöperation with spring $r^5$ quickly separate the jaws and return them to the normal wide open position. It may be added that the act of closing the jaws permits the oppositely curved or inclined faces $j^2$ to engage the sides of the nut and move it bodily upward in the jaw chamber $w^2$ until it is practically centralized therein. Figs. 5 and 6 represent the corresponding open and closed positions of the jaws, the nut shown (see also Fig. 4) being one of the smaller sizes.

The shank $d$ of the anvil member $d^1$ is supported in bearings $d^4$ integral with a bracket $t^2$ secured to the front portion of the bed $t$. See also Fig. 2. A swinging locking member $m$ is pivoted at $d^8$ to the rear bearing; one arm of said member carries a roll $m^2$, its other arm, which is disposed substantially parallel with the rod $d$, having ratchet-shaped teeth $m^1$ adapted when in use to engage the corresponding teeth of a block $d^6$ secured to said rod. Fig. 1 shows the parts in the normally unlocked or free position and Fig. 9 the same when they are interlocked. The following describes the means shown for automatically swinging said member $m$ into and out of its operative position. An endwise movable non-revoluble rod or shaft $h$, which may be termed the locking-rod, is mounted horizontally in bearings $h^1$ disposed at the rear side of the bed and parallel with the longitudinal axis of the machine. A dog or cam $o$ is secured to the front end portion of the rod at a point adjacent the said member $m$. It (the cam) is provided with short plane surfaces, $o^1$, $o^2$, against which the roll $m^2$ is adapted to bear. A spring $d^7$ (Fig. 1) operates to maintain the parts $m^2$ and $o^1$ in normal contact during certain portions of the plunger's stroke, thereby preventing the interlocking of the members $m^1$ and $d^6$. At or near the rear end of the rod $h$ the latter is provided with an elongated shallow notch $h^5$ into which the upper portion of a vertically extending swinging lever E is adapted to enter. This lever (see Figs. 1, 10 and 11) is pivoted at $h^2$ to the corresponding standard $h^1$, the latter also forming a bearing for the locking-rod. The lever E is resisted by a spring $h^4$ supported in a lug $h^3$ integral with the standard. A pointed tripping or releasing-pin $h^6$ is fixed in the lever and extends therefrom in front a short distance parallel with the rod $h$. The said arm $l$ of the plunger-rod $e$ is freely slidable on the rod $h$; the former also has a hole therethrough arranged to receive the said pin $h^6$ when the plunger is at or near the end of its rearward stroke. The rod $h$ is also provided with a pressure-controlling device or means for regulating the degree of force exerted endwise by the plunger upon the nut in cracking its shell. Said device (see Figs. 1 and 12) comprises an annular screw $c^3$ secured to rod $h$, an adjusting member or tapped collar $c^4$, a check nut $c^5$ mounted on the screw, and a helical compression spring $c^6$ surrounding the rod and interposed between said screw and the bearing $h^1$ located near the rear jaw's supporting-bar. In the practical operation of this device the arm $l$ upon being advanced by the plunger say to the dotted position (Fig. 1) will then engage the collar $c^4$ and force the rod $h$ ahead a short distance against the tension of spring $c^6$, thereby too advancing the dog $o$ relatively to the locking member $m$ and swinging the toothed portion $m^1$ of the latter inwardly into engagement with the toothed block $d^6$ of the slowly moving anvil-rod $d$, thus arresting the latter's movement (see Fig. 9). During the locking-rod's forward action the said notch $h^5$ at its rear end will become exposed, at which instant the spring $h^4$ swings the lever E into the notch. See also Fig. 11. The final action of the plunger-driving cam $b$, being the point portion $b^2$, then contracts the distance between the end of the plunger and that of the then temporarily stationary anvil. It is to be borne in mind that the anvil is advanced with the plunger by the action of the latter upon the nut interposed and held between them; the anvil it may be observed is maintained in yielding contact with the nut during said forward movement by a spring $d^5$. The anvil remains locked or clutched in its stationary position until the plunger upon nearing the end of its rearward stroke causes the beveled end of the pin $h^6$ of lever E to enter the hole $l^x$, indicated in Fig. 12, of the arm $l$, thereby forcing the lever out of the notch, at which instant spring $c^6$ retracts the rod $h$ until it is arrested by the engagement of its enlarged front end or stop $h^8$ with the adjacent standard or bearing member $h^1$; at the same time the correspondingly changed position of the dog $o$ permits the spring $d^7$ to release the member $m$ from block $d^6$ and allows the spring $d^5$ to move the anvil rearwardly or inwardly until it in turn is arrested by the contacting of said block with the rear bearing $d^4$, substantially as represented in Fig. 1.

The following describes the mechanism for actuating the series of slitting saws $s$ and the manner of arranging and mounting them in the operating chamber $D^1$ of the main head D fixed to the top of the table. It may be stated in advance that the front and rear side walls, $i'$, $i$, and the peripheral casing member $i^4$ constitute the housing, the sides being secured together by tie-bolts $g^{10}$. The said chamber is in continuous open communication at the bottom with an air-pipe $z$ leading therefrom to suitable exhaust mechanism or suction-blower B. See Fig. 2. Returning again to the nut-slitting mechanism: A relatively large revoluble crown gear $g$ is located within the head D, its hub $i^6$ being annular and extending through a central bearing $i^5$ in the front wall $i^1$, see Fig. 4. To said hub is secured the belt-driven pulley P; the arrangement being such that endwise movement of the parts is prevented. The web or plate of said gear has a central opening $i^3$ in alinement with the opening $i^2$ formed in the opposite or rear wall $i$. The hole $i^3$ opens into the enlarged chambered part H of the gear's hub. I prefer to make the inner surface of the wall of the hub portion divergent or outwardly flaring, as indicated at $i^6$ in Figs. 4 and 9. As thus constructed the treated nuts when released in the chamber H are upon striking said beveled part given a tendency to fall outwardly therefrom, at the same time the resilient clearer member $u$ is adapted to free any nuts that may be adhering to the rim by centrifugal action. See Fig. 9.

The several sets of saw mechanisms (see Fig. 7) are mounted in radially arranged main holders or brackets G secured by bolts $v$ to the rear wall $i$ of the housing D. Each set of saws, two in number as drawn, is secured to its arbor $s^1$, in turn revolubly supported in an endwise movable spring-pressed frame F carried by the corresponding bracket G. The member F has a turned shank $g^4$ (Fig. 8) extending through a bushing $g^5$ revoluble in the bracket. The outer end portion of said shank part is counterbored to receive a spring $g^7$ and is fitted to move longitudinally, within fixed limits, in said bracket. A screw-threaded rod, $g^6$, extends from the shank through a fixed cap-plate $g^8$, which latter also serves to confine the spring in position, and is provided with nuts $g^9$ for controlling the tension of the spring. To the inner end portion of said bushing $g^5$ is secured a small spur gear $g^1$ positioned so as to be in continuous engagement with the teeth of the crown-gear $g$ and be rotated by it. The frame F also carries a short revoluble shaft $v^1$ arranged parallel with said shank $g^4$ on which is secured a small gear $g^2$ meshing with gear $g^1$, and a bevel gear $g^3$ intergearing with a similar gear $g^3$ secured to the saw-arbor. The shaft $v^1$ extends into and is capable of endwise movement in the bracket, thereby maintaining the frame and its members in their respective working planes. I prefer to arrange the saws in pairs or sets (one of which is more clearly represented in Fig. 13) and having a comparatively thick central washer or disk $s^2$ interposed between them, the whole being clamped together on the arbor by the thin outer washers $s^4$ and nut $s^5$. The diameter of the said members $s^2$ and $s^4$ and their form transversely, as indicated at $s^3$, may be devised to conform in an approximate manner to the corresponding convexity of the shell of the nut, while at the same time serving as a gage for limiting the depth of the kerf or slits $n^1$ produced in the nut's shell, thereby preventing the saws from cutting or mutilating the meats.

In my improved nut-shelling machine A, which is adapted for continuous operation and in which the several devices or elements thereof have been properly positioned and timed, the attendant first places a nut in the chamber $w^2$ of the open jaws while the plunger is at or near the end of its rearward stroke, as indicated in Figs. 1 to 5 and Fig. 14. The cam $f^3$ and its coöperating mechanism then immediately close the jaws, thereby positioning and centralizing the nut; the main driving cam $v$ at the same time slowly moving the plunger ahead to engage the adjacent end of the nut (Fig. 15); the continued movement of the plunger forces the nut endwise until its forward end engages and seats itself in the rear end of the then stationary anvil $d^1$ (Fig. 16); the further and gradually increasing ratio of cam movement carries the still supported nut into engagement with and past the several rapidly revolving saws $s$, thereby cutting longitudinal parallel slits $n^1$ in the nut's shell, the saws at the same time adapting themselves to the shape of the nut. Fig. 17 shows the thus slitted and held nut. The further rotation of the cam $b$ correspondingly advances the nut-holding members, $e^1 d^1$, and carries it (the nut) through or partly through the central opening $i^3$ of the gear $g$ (as determined by previous adjustment), at which instant the arm $l$ secured to the moving plunger's shank $e$ engages the collar $c^4$ of the spring-pressed locking-rod $h$ and forces the latter ahead a short distance, thereby permitting the rear locking-lever E to spring into the rod's notch $h^5$ thus preventing further normal forward movement of the rod and anvil and at the same time causing the dog $o$ to swing the toothed portion of the forward locking member $m$ into engagement with the then contiguous toothed block $d^6$ of the anvil-rod $d$. Fig. 9 shows the corresponding position of the last-named parts. Fig. 18 also shows the rear end portion of the thus checked anvil. The final action of the cam $b$ carries the plunger ahead to its limit thereby contracting the distance between the members $e^1$ and $d^1$ and crushing or fracturing the nut's shell, substantially as represented at $n^2$ in Fig. 18. Now when the point portion $b^2$ of said cam passes the roll $b^1$ of the cross-head in its rearward stroke the weight $w$, &c., retracts the plunger and permits the nut to fall by gravity into the bottom of the chamber H of the revolving gear's hub $i^6$, the nut being then deflected and discharged therefrom by the positioned clearer $u$. Just prior to the end of the rearward stroke the arm $l$, &c., releases lever E thus unlocking the rod $h$, the spring $c^6$ at the same time retracting the latter to its limit, as determined by the end stop $h^8$, thereby correspondingly moving the dog $o$ and permitting the spring $d^7$ to release member $m$ from the toothed block of the still stationary anvil-rod, at which instant the spring $d^5$ quickly moves the latter rearwardly to its limit thus placing the anvil in position to coöperate with the plunger in receiving and holding the next nut, thus completing the cycle of operations. It may be stated that a single nut is received and operated upon during a complete revolution of the shaft $a$.

What I claim as my invention and desire to secure by United States Letters Patent, is:—

1. In a machine for shelling or slitting and cracking the shells of nuts, the combination of a plurality of operatively mounted saws, mechanism for holding and subjecting a nut to the action of said saws so as to produce slits in its shell, and means for cracking the thus slitted shell before the nut is discharged from the machine.

2. In a machine of the character described, the combination with oppositely disposed alining plunger and anvil members adapted to temporarily receive and hold a nut therebetween, and means for actuating and controlling the movements of said members, of means for producing a plurality of slits in the nut's shell, and mechanism for cracking the thus slitted shell before the nut is released from the said holding members.

3. In a machine of the character described, the combination with a nut holding device and a plurality of yieldingly mounted revoluble saws disposed with respect thereto, of mechanism for advancing said nut holding means for causing the slitting of the nut's shell by said saws, and means for cracking the thus slitted shell before discharging the nut from the machine.

4. In a machine of the character described, the combination with a pair of alining endwise movable plunger and anvil members arranged to successively receive and hold nuts placed singly therebetween, and a plurality of rapidly revoluble saws, of mechanism for moving said plunger and anvil members in a longitudinal direction so as to cause the nut's shell to be engaged and slitted by said saws, means for automatically shortening the longitudinal distance between the ends of the plunger and anvil immediately succeeding the action of the saws thereby correspondingly compressing the thus acted upon nut and cracking its shell, and means for releasing the nut and returning the several devices or elements back to their normal positions.

5. In a machine of the character described, provided with a pair of endwise movable normally independent plunger and anvil members adapted to receive and hold a nut placed endwise between them, and a plurality of rapidly revoluble saws for longitudinally slitting the shell of the thus held nut, the combination therewith of means for temporarily contracting the distance between the ends of the said nut holding members, thereby cracking or fracturing the slotted shell of the thus held nut before it is discharged from the machine.

6. In a machine of the character described, the combination with a pair of spring-pressed mechanically actuated jaws adapted to freely receive single nuts varying in size, and a plurality of small suitably mounted revoluble saws, of a pair of alining plunger and anvil members, means for actuating said members whereby the nut is centralized and held between them and then carried from said jaws to be acted upon by the saws, and means coöperating with the nut holding members for cracking the shell of the thus supported nut before it is discharged from the machine.

7. In a machine of the character described, the combination of a series of suitably arranged revoluble saws, a pair of mechanically movable plunger and anvil members for holding a nut therebetween and subjecting its shell to the cutting or slitting action of said saws, means for exhausting the chips and dust from the main operating head or chamber, and mechanism for cracking the nut's shell after it has been acted upon by the saws and prior to its being discharged from the machine.

8. In a machine of the character described, the combination with mechanically movable alining plunger and anvil members arranged to hold a nut endwise therebetween, and a series of revoluble saws having their cutting edges located in the path of the thus-held nut, of a device for locking both plunger and anvil together at a predetermined point in the plunger's forward movement, means for temporarily holding the anvil stationary while the plunger is completing its said forward stroke, and means operatively connected with said locking device and plunger for releasing the anvil while the plunger is moving rearwardly.

9. In a machine of the character described provided with a pair of mechanically movable alining plunger and anvil members arranged to receive and hold a nut endwise therebetween, and means for temporarily locking and holding the anvil stationary and also for releasing it during each revolution of the machine, the combination therewith of a pair of coöperating nut-receiving jaws arranged with relation to said plunger and anvil members, said jaws having their inner adjacent faces constructed so as to centralize and hold nuts varying in diameter, means for moving the jaws toward and from each other, a positively actuated cam, and a spring-pressed element, $r^1$, engaging said cam and being operatively connected with said jaw-moving means arranged to impart a yielding pressure upon the jaws.

10. In a machine of the character described, the combination of a pair of suitably mounted normally independent alining plunger and anvil members adapted when in use to hold a nut between their adjacent ends, means for longitudinally slitting the shell of the thus held nut, mechanism for reciprocating the plunger in an endwise direction, a device actuated by the latter for locking the anvil to the plunger whereby the two members are capable of movement in unison, a stop for arresting said movement of the anvil just prior to the termination of the forward or working stroke thereby temporarily lessening the distance between the adjacent ends of the members, and means for disconnecting the latter and returning them to their respective normal positions.

11. In a machine of the character described, the combination with a fixed chambered working head having a central opening extending through its end walls, and a series of yieldingly mounted peripherally arranged saws located in said chamber and adapted to rotate in planes substantially parallel with the longitudinal axis of said opening, of means for actuating the saws in a simultaneous manner, means for holding a nut and subjecting its shell to the action of said saws so as to produce slits therein while it is being passed endwise through the chamber and between the saws, and mechanism constructed and arranged to coöperate with said nut-holding means for cracking the thus slitted shell before the nut is released.

12. In a machine of the character described, the combination with a suitably mounted nut-cracking plunger having an arm member $l$ secured thereto, and means for reciprocating the arm-carrying plunger in a longitudinal direction, of a movable anvil member in axial alinement with the plunger, a spring-pressed rod $h$ arranged parallel with said plunger and anvil members having a dog mounted thereon adapted to be engaged by said arm so as to actuate the rod endwise, means consisting of members $o$ and $d^6$ secured to the rod and anvil respectively, and members for controlling the movements of said rod so as to temporarily lock the anvil in position while the nut is being cracked by the plunger, and means operable by said arm for releasing the anvil-locking means while the plunger is returning to its normal position.

13. In a machine of the character described, an endwise movable rod $h$ provided with a notch, an anvil member, a device for locking the anvil in a stationary position, and a spring-pressed latch located with respect to the notched portion of the rod, in combination with a reciprocating plunger member, and means connected with the latter for actuating the rod and said anvil-locking device and for releasing the latch from said notch, substantially as hereinbefore described and for the purpose set forth.

14. In a machine of the character described, the combination of means for longitudinally slitting a nut's shell, endwise reciprocatory alining plunger and anvil members adapted to receive and hold a nut therebetween, means for operatively controlling the movements of the plunger, a device having its movements controlled by the plunger for limiting the forward or outward movement of said anvil member and locking it in position, and means connected with the plunger adapted to engage said device and unlock the anvil before the plunger enters upon its next stroke.

15. In a machine of the character described, the combination of a plurality of suitably mounted slitting saws arranged around a common center, a revoluble driving member for simultaneously rotating said saws having a central opening extending longitudinally therethrough and an annular hub having the inner surface of its wall outwardly flaring and forming an enlarged chamber in continuous open communication with said central opening, means for holding a nut and subjecting it to the action of the saws thereby slitting its shell, and means for releasing the thus acted upon nut so that it will fall upon the beveled circumscribing surface of said chamber and be discharged therefrom.

16. In a machine of the character described, the combination of a revolubly mounted saw driving member having an enlarged central opening extending therethrough into which the treated nuts are discharged, and a relatively stationary clearing device having a member thereof projecting into said opening for freeing any nuts adhering to the inner wall of the opening by centrifugal force.

Signed at Suncook, N. H., this 31 day of August, 1908.

CHARLES S. STEVENS.

Witnesses:
C. R. STEVENS,
J. F. LYNCH.